US011580780B2

(12) United States Patent
Yu et al.

(10) Patent No.: US 11,580,780 B2
(45) Date of Patent: Feb. 14, 2023

(54) UNIVERSAL FEATURE REPRESENTATION LEARNING FOR FACE RECOGNITION

(71) Applicant: NEC Laboratories America, Inc., Princeton, NJ (US)

(72) Inventors: Xiang Yu, Mountain View, CA (US); Manmohan Chandraker, Santa Clara, CA (US); Kihyuk Sohn, Fremont, CA (US); Yichun Shi, Haslett, MI (US)

(73) Assignee: NEC Corporation

( * ) Notice: Subject to any disclaimer, the term of this patent is extended or adjusted under 35 U.S.C. 154(b) by 293 days.

(21) Appl. No.: 17/091,011

(22) Filed: Nov. 6, 2020

(65) Prior Publication Data

US 2021/0142043 A1    May 13, 2021

Related U.S. Application Data

(60) Provisional application No. 62/934,620, filed on Nov. 13, 2019.

(51) Int. Cl.
*G06N 20/00* (2019.01)
*G06K 9/62* (2022.01)
*G06V 40/16* (2022.01)

(52) U.S. Cl.
CPC ........ *G06V 40/166* (2022.01); *G06K 9/6267* (2013.01); *G06N 20/00* (2019.01)

(58) Field of Classification Search
None
See application file for complete search history.

(56) References Cited

U.S. PATENT DOCUMENTS

| 2019/0205620 | A1* | 7/2019  | Yi         | G06V 10/454 |
| 2021/0142046 | A1* | 5/2021  | Yu         | G06N 3/08   |
| 2021/0374468 | A1* | 12/2021 | Chandraker | G06K 9/6255 |
| 2022/0147767 | A1* | 5/2022  | Yu         | G06N 3/08   |

OTHER PUBLICATIONS

Wang et al., "CosFace: Large Margin Cosine Loss for Deep Face Recognition", Tencent AI Lab, Jan. 2018, pp. 1-10.
Deng et al., "ArcFace: Additive Angular Margin Loss for Deep Face Recognition", Apr. 2018, pp. 1-10.

\* cited by examiner

*Primary Examiner* — Dov Popovici
(74) *Attorney, Agent, or Firm* — Joseph Kolodka

(57) ABSTRACT

A computer-implemented method for implementing face recognition includes receiving training data including a plurality of augmented images each corresponding to a respective one of a plurality of input images augmented by one of a plurality of variations, splitting a feature embedding generated from the training data into a plurality of sub-embeddings each associated with one of the plurality of variations, associating each of the plurality of sub-embeddings with respective ones of a plurality of confidence values, and applying a plurality of losses including a confidence-aware identification loss and a variation-decorrelation loss to the plurality of sub-embeddings and the plurality of confidence values to improve face recognition performance by learning the plurality of sub-embeddings.

20 Claims, 4 Drawing Sheets

UNIVERSAL FEATURE REPRESENTATION LEARNING FOR FACE RECOGNITION

RELATED APPLICATION INFORMATION

This application claims priority to provisional application Ser. No. 62/934,620, filed on Nov. 13, 2019, incorporated by reference herein in its entirety.

BACKGROUND

Technical Field

The present invention relates to artificial intelligence and machine learning, and more particularly to face recognition.

Description of the Related Art

Deep face recognition seeks to map input images to a feature space with small intra-identity distance and large inter-identity distance. Face recognition can be difficult as faces can appear in many varieties that cannot be simply synthesized or predicted. Conventional face recognition techniques either train with specifically annotated variation data, or by introducing variation data to adapt from the training data. Alternatively, individual models may be trained on various datasets and ensembled to obtain performance over each single model.

SUMMARY

According to an aspect of the present invention, a computer-implemented method is provided for implementing face recognition. The computer-implemented method includes receiving training data including a plurality of augmented images each corresponding to a respective one of a plurality of input images augmented by one of a plurality of variations, splitting a feature embedding generated from the training data into a plurality of sub-embeddings each associated with one of the plurality of variations, associating each of the plurality of sub-embeddings with respective ones of a plurality of confidence values, and applying a plurality of losses including a confidence-aware identification loss and a variation-decorrelation loss to the plurality of sub-embeddings and the plurality of confidence values to improve face recognition performance.

According to another aspect of the present invention, a system is provided for implementing face recognition. The system includes a memory device storing program code and at least one processor device operatively coupled to the memory device. The at least one processor device is configured to execute program code stored on the memory device to receive training data including a plurality of augmented images each corresponding to a respective one of a plurality of input images augmented by one of a plurality of variations, split a feature embedding generated from the training data into a plurality of sub-embeddings each associated with one of the plurality of variations, associate each of the plurality of sub-embeddings with respective ones of a plurality of confidence values, and apply a plurality of losses including a confidence-aware identification loss and a variation-decorrelation loss to the plurality of sub-embeddings and the plurality of confidence values to improve face recognition performance.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
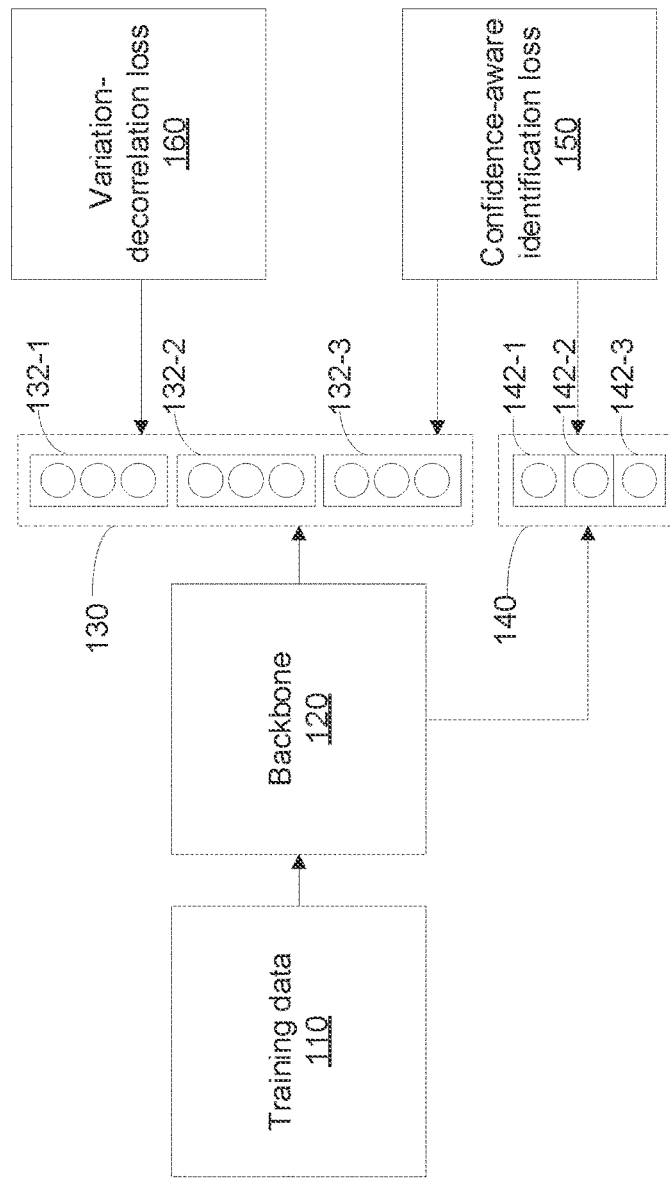
FIG. 1 is a diagram illustrating a face recognition training framework, in accordance with an embodiment of the present invention.

In accordance with embodiments of the present invention, systems and methods are provided for implementing face recognition. More specifically, the embodiments described herein can provide a universal feature representation learning framework for deep face recognition, which is a face representation learning framework that learns universal features by associating them with different variations, thereby leading to improved generalization on unseen variations. During training, a single universal feature representation can be targeted to conduct face recognition on augmented images (e.g., low-quality images), without leveraging the images for training or for domain adaptation. For example, the augmented images can be augmented by variations including, but not limited to, blurriness (e.g., low-resolution), occlusion and pose (e.g., head pose). The embodiments described herein introduce a confidence-aware identification loss to learn from hard examples, which is further extended by splitting a feature embedding (e.g., feature vector) into a plurality of sub-embeddings with independent confidence. The variations are applied to further decorrelate the feature embedding using variation-decorrelation loss. The embodiments described herein can discover further non-augmentable variations to achieve better decorrelation. An uncertainty-guided pairwise metric can be used for inference.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Referring now in detail to the figures in which like numerals represent the same or similar elements and initially to FIG. 1, a block/flow diagram is provided illustrating a face recognition training framework 100.

As shown, the framework 100 includes training data 110 including a plurality of augmented images each include a face image. More specifically, the one or more augmented images can include a plurality of augmented face images. In one embodiment, the plurality of augmented face images can include human face images. However, such an embodiment should not be considered limiting, and the embodiments described herein can be applied to perform face recognition training with respect to any suitable face images.

As used herein, the term "augmented image" refers to an image that is generated by modifying an input image (e.g., "high-quality" image) to include one or more pre-defined variations. For example, the training data 110 can be generated by applying online variation data augmentation to introduce the one or more (pre-defined) variations into one or more input images. Examples of variations include, but are not limited to, blurriness (e.g., low-resolution), occlusion and pose (e.g., head pose). Accordingly, the plurality of augmented images correspond to "low-quality" images that are intentionally generated for training purposes.

As further shown, the training data 110 is fed into a backbone neural network structure 120 configured to generate a feature representation or embedding. In one embodiment, the backbone neural network structure 120 is a backbone deep neural network structure configured to generate a deep feature embedding. For example, the backbone neural network structure 120 can include a residual neural network (ResNet). In one embodiment, the backbone neural network structure 120 can include an iterative ResNet (iResNet).

As further shown, the feature embedding is split into a set of sub-embeddings 130. For example, as shown, the set of sub-embeddings 130 can include a plurality of sub-embeddings 132-1 through 132-3 representing respective ones of blurriness, occlusion and pose. Accordingly, the plurality of sub-embeddings 132-1 through 132-3 each represent different factors of variations.

When training is conducted among quality-various samples, if we assume the same confidence across all samples, a learned prototype will be in the center of all samples. This is irrational as low-quality samples convey more ambiguous identity information. In contrast, if we set up sample-specific confidence, of which high-quality samples show higher confidence, the prototype is pushed to be more similar to high-quality samples in order to maximize the posterior.

Thus, the framework 100 further includes a set of confidences 140. Alternatively, the set of confidences 140 can be viewed as a set of uncertainties. and the set of confidences 140 can include a plurality of sample-specific confidences 142-1 through 142-3 associated with respective ones of the plurality of sub-embeddings 132-1 through 132-3.

In this illustrative example, the set of sub-embeddings 130 includes three sub-embeddings and the set of confidences 140 includes three confidences. However, the set of sub-embeddings 130 and the set of confidences 140 can include any suitable number of sub-embeddings and confidences, respectively, in accordance with the embodiments described herein.

As further shown, the framework 100 further includes a confidence-aware identification loss component 150. The confidence-aware identification loss component 150 is configured to apply a confidence-aware identification loss to the set of sub-embeddings 130 and the set of confidences 140. More specifically, the confidence-aware identification loss can be based on a confidence-aware posterior in which a sample-specific confidence is used to push a prototype vector (e.g., identity template feature) to be more similar to high-quality training images in order to maximize the confidence-aware posterior. Meanwhile, if a feature embedding of the training image is low-quality, the sample-specific confidence can provide a stronger push for the feature embedding to be closer to a prototype vector during an update of the feature embedding.

Setting up the set of sub-embeddings 130 along does not guarantee the features in different groups are learning complementary information. For example, the plurality of sub-embeddings 132-1 through 132-3 can be highly correlated. By penalizing the plurality of sub-embeddings 132-1 through 132-3 with different regularization, the correlation among them can be reduced. By associating different ones of the plurality of sub-embeddings 132-1 through 132-3 with different variations, we can conduct variation classification loss on a subset of all the sub-embeddings while conducting variation adversarial loss in terms of other variation types. Given multiple variations, such two regularization terms can be forced on different subsets, leading to better sub-embedding decorrelation.

To achieve this decorrelation, as further shown, the set of sub-embeddings 130 is also fed into a variation-decorrelation loss component 160. The variation-decorrelation loss component 160 is configured to apply a variation-decorrelation loss to the set of sub-embeddings 130 to reduce the correlation among those of the plurality of sub-embeddings 130. More specifically, the variation-decorrelation loss decouples different ones of the plurality of sub-embeddings 132-1 through 132-3 by associating them with different domains in the training data 110. For example, the application of the variation-decorrelation loss to the plurality of sub-embeddings 132-1 through 132-3 can force the plurality of sub-embeddings 132-1 through 132-3 to be less invariant to blurriness, occlusion, pose, etc. Accordingly, the variation-decorrelation loss can improve face recognition training.

To further illustrate the framework 100, including the components 150 and 160, let y be an identity label and N be the number of identities. We investigate the posterior probability of being classified to identity $j \in \{1,2,\ldots,J\}$, given the input sample $x_i$. We denote the feature embedding of sample i as $f_i$ and the j-th identity prototype vector as $w_j$, which is the identity template feature. A probabilistic embedding network θ can represent each sample $x_i$ as a Gaussian or normal distribution in the feature space. The likelihood of $x_i$ being a sample of the class j can then be given by:

$$p(x_i \mid y=j) \propto p_\theta(w_j \mid x_i) = \frac{1}{(2\pi\sigma_i^2)^{\frac{D}{2}}} \exp\left(-\frac{\|f_i - w_j\|^2}{2\sigma_i^2}\right) \quad (1)$$

where $\sigma_i^2$ is the variance of the Gaussian distribution and D is the feature dimension. Further assuming that the prior of assigning a sample to any identity as equal, posterior of $x_i$ belong to the j-th class can be given by:

$$p(y=j \mid x_i) = \frac{p(x_i \mid y=j)p(y=j)}{\sum_{c=1}^{J} p(x_i \mid y=c)p(y=c)} = \frac{\exp\left(-\frac{\|f_i - w_j\|^2}{2\sigma_i^2}\right)}{\sum_{c=1}^{J}\exp\left(-\frac{\|f_i - w_c\|^2}{2\sigma_i^2}\right)} \quad (2)$$

For simplicity, define a confidence value $$s_i = \frac{1}{\sigma_i^2},$$

indicating the confidence of assigning some identity $w_j$ to $f_i$. Constraining both $w_j$ to $f_i$ on the $l_2$-normalized unit sphere, we have $$\frac{\|f_i - w_j\|^2}{2\sigma_i^2} = s_i(1 - w_j^T f_i),$$

and thus $$p(y=j \mid x_i) = \frac{\exp(s_i w_j^T f_i)}{\sum_{c=1}^{J}\exp(s_i w_c^T f_i)} \quad (3)$$

where $w_j^T$ represents the transpose of $w_j$.

During embedding $f_i$ update, a stronger push is provided for a low-quality $f_i$ to be closer to the prototype. Accordingly, performing confidence guiding in accordance with, e.g., Equation 5, the learned prototype vector $w_j$ is pushed closer to high-quality samples to represent the identity better.

Additional loss margin can be used to narrow the within-identity distribution and widen an inter-identity distribution. Such additional loss margin can be incorporated into the loss form as follows:

$$L'_{idt} = -\log\frac{\exp(s_i w_{y_i}^T f_i - m)}{\exp(s_i w_{y_i}^T f_i - m) + \sum_{j \neq y_i}\exp(s_i w_j^T f_i)} \quad (4)$$

where $y_i$ is the ground-truth label of $x_i$ and m is the loss margin.

The confidence-aware identification loss can be confidence-aware softmax (C-Softmax) loss, which is different from cosine loss as follows: (1) each image has an independent and dynamic confidence value $s_i$ rather than a constant shared scalar and (2) the margin parameter m is not multiplied by $s_i$. The independence of $s_i$ allows it to gate the gradient signals of $w_i$ and $f_i$ in a sample-specific way, as the confidence (degree of variation) of each training sample could be largely different. Though samples are specific, a heterogeneous feature space can be pursued such that the metric across different identities should be consistent. Thus, by allowing $s_i$ to compensate the samples' confidence difference, the loss margin m can be isolated to be constantly shared across all the identities.

Though the feature embedding $f_i$ learned through a sample-specific gating $s_i$ can deal with sample-level variations, the correlation among the entries of $f_i$ itself can still be high. To maximize the representation power and achieve a compact feature size, decorrelating the entries of the embedding may be necessary.

To achieve this, and as described above, the feature embedding $f_i$ is partitioned into the set of sub-embeddings 130, each of which is assigned with a different confidence value from the set of confidences 140. More specifically, $f_i$ can be partitioned into K equal-length sub-embeddings, and the prototype vector $w_j$ and the confidence value $s_i$ can be partitioned into the same K sized groups as follows:

$$w_j = [w_j^{(1)T}, w_j^{(2)T}, \ldots w_j^{(K)T}]$$

$$f_i = [f_i^{(1)T}, f_i^{(2)T}, \ldots f_i^{(K)T}]$$

$$s_i = [s_i^{(1)T}, s_i^{(2)T}, \ldots s_i^{(K)T}] \quad (5)$$

Where each group of sub-embeddings $f_i^{(k)}$ is l-2 normalized onto the unit sphere separately. The final identification loss can thus be given by:

$$L_{idt} = -\log \frac{\exp(a_{i,y_i} - m)}{\exp(a_{i,y_i} - m) + \sum_{j \neq y_i} \exp(a_{i,j})} \quad (6)$$

$$a_{i,j} = \frac{1}{K} \sum_{k=1}^{K} s_i^{(k)} w_j^{(k)T} f_i^{(k)}. \quad (7)$$

A common issue for neural networks is that they tend to be "over-confident" on predictions. To address this, an additional $l_2$ regularization can be added to constrain the confidence from growing arbitrarily large as follows:

$$L_{reg} = \frac{1}{K} \sum_{k=1}^{K} s_i^{(k)}. \quad (8)$$

For each augmentable variation $t \in \{1, 2, \ldots, M\}$, a binary mask $V_t$ can be generated, which selects a random first K/2 subset of all sub-embeddings while setting the second K/2 subset to be zeros. The masks can be generated at the beginning of the training and can remain fixed during training. The masks are different for different variations. It is expected that $V_t(f_i)$ reflects the t-th variation while being invariant to the other variations. Accordingly, a multi-label binary discriminator C can be built by learning to predict all variations from each masked subset as follows:

$$\min(L_C) \atop C =$$

$$-\sum_{t=1}^{M} \log p_c(u_i = \hat{u}_i \mid V_t(f_i)) = -\sum_{t=1}^{M} \sum_{t'=1}^{M} \log p_c(u_i^{(t')} = \hat{u}_i^{(t')} \mid V_t(f_i)) \quad (9)$$

where $u_i = [u_i^{(1)}, u_i^{(2)}, \ldots, u_i^{(M)}]$ are the binary labels (0/1) of the known variations and $\hat{u}_i$ is the ground-truth label. For example, if t=1 corresponds to resolution, $\hat{u}_i^{(1)}$ would be 1 for high-resolution images and 0 for low-resolution images. It is noted that Equation 9 is only used for training the discriminator C.

The corresponding classification loss $L_{cls}$ and adversarial loss $L_{adv}$ of the embedding network can then be given by:

$$L_{cls} = -\sum_{t=1}^{M} \log p_c(u_i^{(t)} = \hat{u}_i^{(t')} \mid V_t(f_i)) \quad (10)$$

$$L_{adv} = -\sum_{t=1}^{M} \sum_{t' \neq t} \left( \frac{1}{2} \log p_c(u_i^{(t')} = 0 \mid V_t(f_i)) + \frac{1}{2} \log p_c(u_i^{(t')} = 1 \mid V_t(f_i)) \right) \quad (11)$$

The classification loss $L_{cls}$ encourages $V_t$ to be variation-specific while the adversarial loss $L_{cls}$ encourages in-variance to the other variations. As long as no two masks are the same, it guarantees that the selected subset $V_t$ is functionally different from another subset $V_{t'}$, thus achieving decorrelation between $V_t$ and $V_{t'}$. The overall loss function for each sample can be provided as $$\min L \atop \theta = L_{idt} + \lambda_{reg} L_{reg} + \lambda_{cls} L_{cls} + \lambda_{adv} L_{adv} \quad (12)$$

Where during optimization, Equation 12 is averaged across the samples in the mini-batch.

As noted above, in one embodiment, there are three augmentable variations (blur, occlusion and pose). However, such a number can correspond to a limited decorrelation effect as the number of subsets $V_t$ may be too small. Thus, to further enhance the decorrelation and to introduce more variations for better generalization ability, in some embodiments, additional variations with semantic meaning can be mined. Not all variations are easy to use for conducting data augmentation (e.g., smiling or not smiling can be hard to augment). For such variations, we can mine out variation labels from original training data. In particular, an attribute dataset can be leveraged to train an attribute classification model $\theta_A$ with identity adversarial loss as follows:

$$\min L_{\theta_A} \atop \theta_A = -\log p(l_A \mid x_A) = \frac{1}{N_A} \sum_{c}^{N_A} \log p(y_A = c \mid x_A) \quad (13)$$

$$\min L_{D_A} \atop D_A = -\log p(y_A = y_{x_A} \mid x_A)$$

where $l_A$ is the attribute label, $y_A$ is the identity label, $x_A$ is the input face image and $N_A$ is the number of identities in the attribute dataset. The first term, $L_{\theta_A}$, penalizes the feature to classify face attributes and the second term, $L_{D_A}$, penalizes the feature to be invariant to identities.

The attribute classifier can then be applied to the recognition training set to generate T additional soft variation labels (e.g., smiling or not smiling, young or old). These additional soft variation labels can be merged with the original augmentable variations labels as $u_i = [u_i^{(1)}, u_i^{(2)}, \ldots, u_i^{(M)}, u_i^{(M+1)}, \ldots, u_i^{(M+T)}]$ and then incorporated into the decorrelation learning performed by the component 160.

Considering the metric for inference, simply taking the average of the learned sub-embeddings can be a sub-optimal option. This is because different sub-embeddings can show different discriminative power for different variations, and their importance should vary according to given image pairs. Thus, pairwise similarity scores according to respective image pairs can be obtained as follows:

$$\text{score}(x_i, x_j) = -\frac{1}{2} \sum_{k=1}^{K} \frac{\|f_i^{(k)} - f_j^{(k)}\|^2}{\sigma_i^{(k)2} + \sigma_j^{(k)2}} - \frac{D}{2K} \sum_{k=1}^{K} \log(\sigma_i^{(k)2} + \sigma_j^{(k)2}) \quad (14)$$

where each of the pairwise similarity scores score($x_i$, $x_j$) corresponds to learned sub-embedding importance. With Equation 8 for regularization, it can be seen that the confidence learned with the identification loss can still tend to be overconfident and hence cannot be directly used for Equation 14. Thus, the original confidence branch can be fine-tuned to predict σ while fixing the other parts.

Further details regarding confidence-aware identification loss and variation-decorrelation loss will now be described with reference to FIG. 2.

Figure 2:
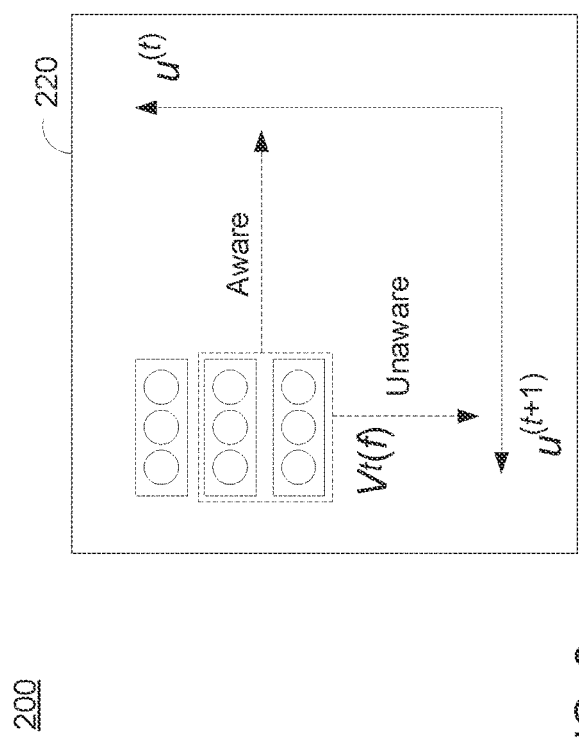
FIG. 2 is a diagram illustrating confidence-aware identification loss and variation-decorrelation loss, in accordance with an embodiment of the present invention.
Figure 2:
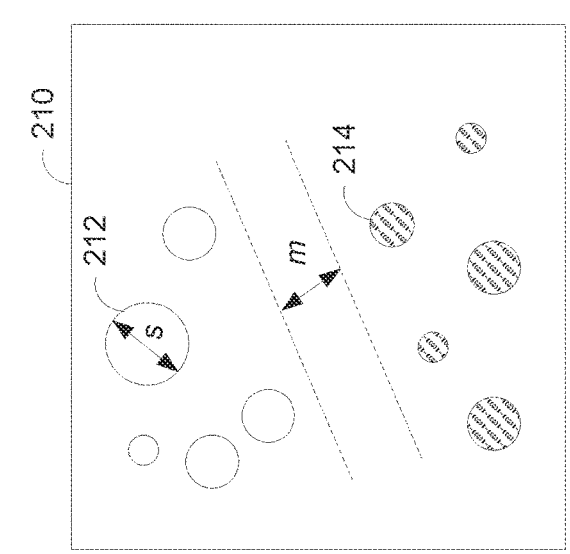

Referring now to FIG. 2, a diagram 200 is provided illustrating a block 210 corresponding to confidence-aware identification loss and a block 220 corresponding to variation-decorrelation loss.

As shown in block 210 for the illustration of confidence-aware softmax (C-Softmax) loss, a plurality of samples of a class A 212 and a plurality of samples of a class B 214 are separated by a margin m. The diameter of each of the samples 212 and 214 corresponds to a confidence value s.

As shown in block 220 for the illustration of variation-decorrelation loss, we consider two variations as two axes $u^{(t)}$ and $u^{(t+1)}$ and subset $V_r$. By applying the variation-decorrelation loss described herein, the correlation of features alongside the two axes can be decreased.

The face recognition training performed in accordance with the embodiments described above with reference to FIGS. 1 and 2 can be implemented to perform face recognition within any suitable system or context.

Figure 3:
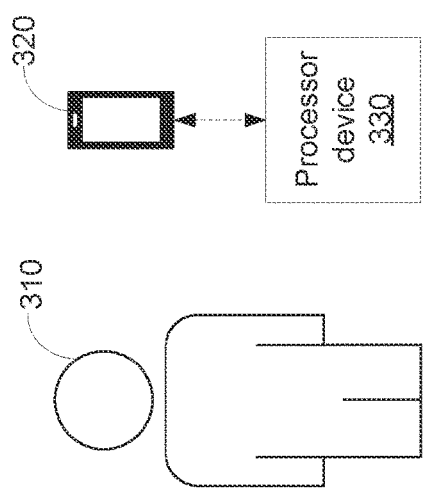
FIG. 3 is a block/flow diagram illustrating an exemplary environment for implementing face recognition, in accordance with an embodiment of the present invention.

For example, referring now to FIG. 3, an exemplary environment 300 for implementing face recognition is shown. More specifically, the environment 300 includes a user 310 and a computing system or device 320. The computing system 320 can implement a biometric system that grants or denies the user 310 access to the computing system 320 based on an analysis of the face of the user 310. For example, in this illustrative embodiment, the computing system 320 is a smartphone that includes a camera. This embodiment is purely exemplary, and the embodiments described herein can be used within any suitable environment.

As further shown, the environment 300 can further include at least one processor device 330. The processor device 330 can be configured to implement the system/method described herein for implementing face recognition Although the processing device 330 is shown as being a separate entity from the computing system 320, the processor device 300 can alternatively be a subcomponent of the computer system 320, or the computer system 320 can be a subcomponent of the processor device 330.

Figure 4:
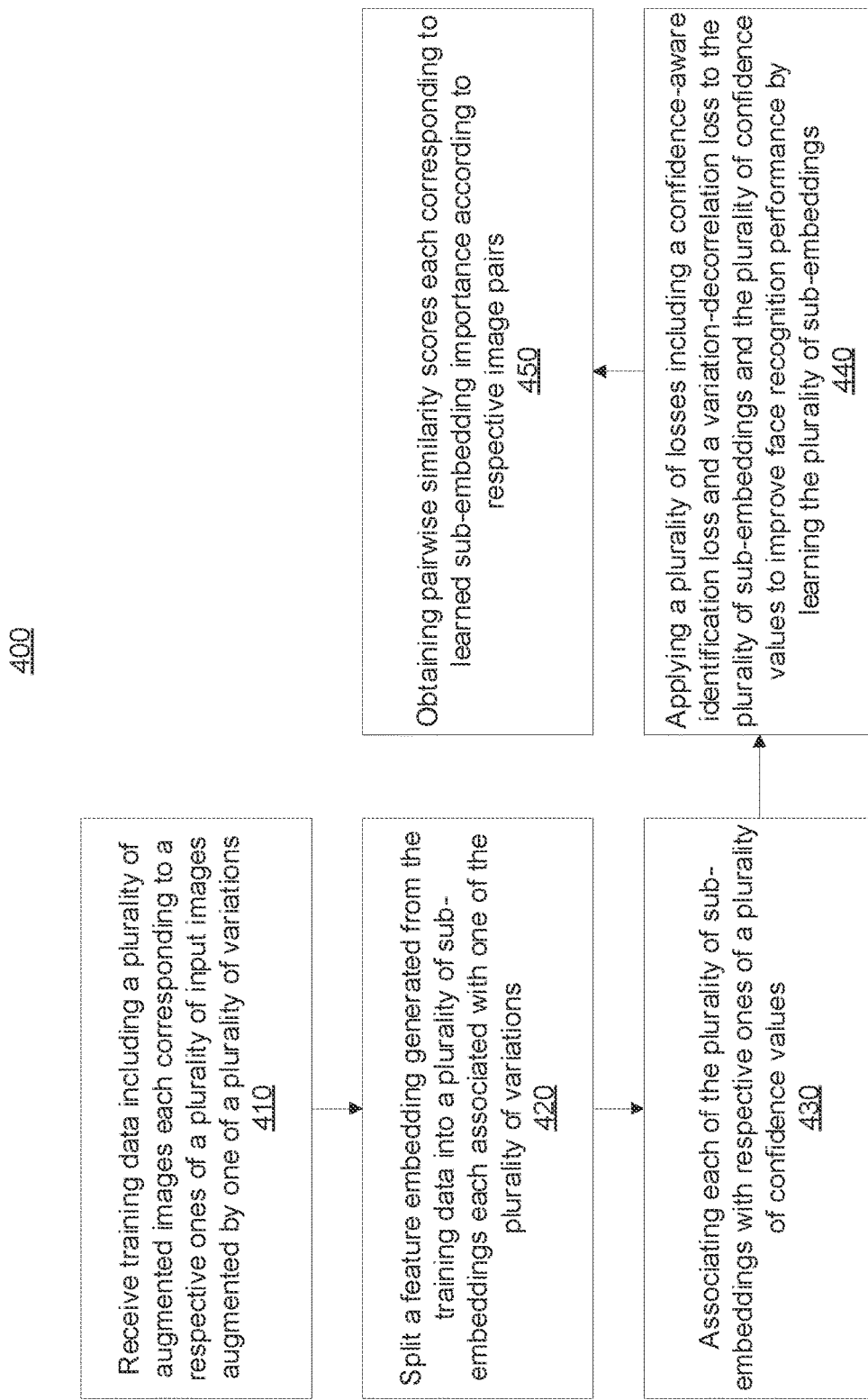
FIG. 4 is a block/flow diagram illustrating a system/method for implementing face recognition, in accordance with an embodiment of the present invention.

Referring now to FIG. 4, a block/flow diagram is provided illustrating a system/method 400 for implementing face recognition.

At block 410, training data including a plurality of augmented images each corresponding to a respective one of a plurality of input images augmented by one of a plurality of variations is received.

At block 420, a feature embedding generated from the training data is split into a plurality of sub-embeddings each associated with one of the plurality of variations. For example, a first sub-embedding can be associated with blur, a second sub-embedding can be associated with occlusion, and a third sub-embedding can be associated with pose.

At block 430, each of the plurality of sub-embeddings is associated with respective ones of a plurality of confidence values.

At block 440, a plurality of losses including a confidence-aware identification loss and a variation-decorrelation loss is applied to the plurality of sub-embeddings and the plurality of confidence values to improve face recognition performance by learning the plurality of sub-embeddings.

The confidence-aware identification loss utilizes confidence guiding to push a learned prototype to be closer to high-quality images to maximize the posterior. During updating of the feature embedding, it also provides a stronger push for a low-quality feature embedding to be closer to the learned prototype. In one embodiment, the confidence-aware identification loss incorporates a loss margin to narrow the within-identity distribution and widen an inter-identity distribution. In one embodiment, the confidence-aware identification loss is implemented as C-Softmax loss.

The variation-decorrelation loss associates different ones of the plurality of sub-embeddings by associating them with different ones of the plurality of variations. For example, one or more sub-embeddings can be forced to be invariant to occlusion, blur and/or pose. By pushing stronger invariance for each variation, the correlation/overlap between two variations can be reduced. In one embodiment, the variation-decorrelation loss applies a classification loss on the plurality of variations and an adversarial loss on different partitions of the plurality of sub-embeddings.

In one embodiment, the plurality of losses further includes an additional regularization to constrain confidence from growing arbitrary large.

At block 450, pairwise similarity scores each corresponding to learned sub-embedding importance are obtained according to respective image pairs.

Further details regarding blocks 410-450 are described above with reference to FIGS. 1-2.

Figure 5:
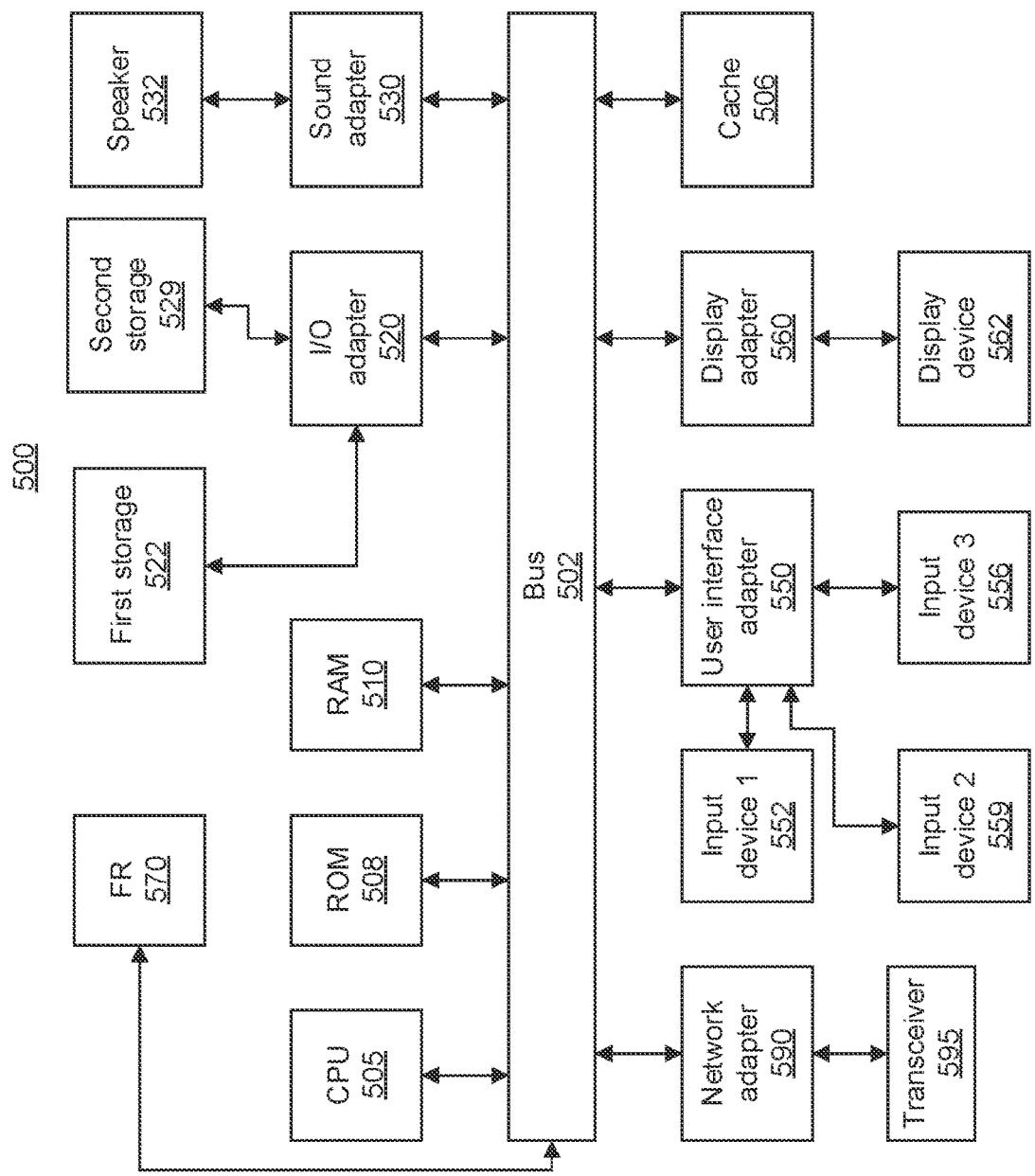
FIG. 5 is a block/flow diagram illustrating a computer system, in accordance with an embodiment the present invention.

Referring now to FIG. 5, an exemplary computer system 600 is shown which may represent a server or a network device, in accordance with an embodiment of the present invention. The computer system 500 includes at least one processor (CPU) 505 operatively coupled to other components via a system bus 502. A cache 506, a Read Only Memory (ROM) 508, a Random-Access Memory (RAM) 510, an input/output (I/O) adapter 520, a sound adapter 530, a network adapter 590, a user interface adapter 550, and a display adapter 560, are operatively coupled to the system bus 502.

A first storage device 522 and a second storage device 529 are operatively coupled to system bus 502 by the I/O adapter 520. The storage devices 522 and 529 can be any of a disk storage device (e.g., a magnetic or optical disk storage device), a solid state magnetic device, and so forth. The storage devices 522 and 529 can be the same type of storage device or different types of storage devices.

A speaker 532 may be operatively coupled to system bus 502 by the sound adapter 530. A transceiver 595 is operatively coupled to system bus 502 by network adapter 590. A display device 562 is operatively coupled to system bus 502 by display adapter 560.

A first user input device 552, a second user input device 559, and a third user input device 556 are operatively coupled to system bus 502 by user interface adapter 550. The user input devices 552, 559, and 556 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 552, 559, and 556 can be the same type of user input device or different types of user input devices.

The user input devices 552, 559, and 556 are used to input and output information to and from system 500.

Face recognition (FR) component 570 may be operatively coupled to system bus 502. FR component 570 is configured to perform one or more of the operations described above. FR component 570 can be implemented as a standalone special purpose hardware device, or may be implemented as software stored on a storage device. In the embodiment in which FR component 570 is software-implemented, although shown as a separate component of the computer system 500, FR component 570 can be stored on, e.g., the first storage device 522 and/or the second storage device 529. Alternatively, FR component 570 can be stored on a separate storage device (not shown).

Of course, the computer system 500 may also include other elements (not shown), as readily contemplated by one of skill in the art, as well as omit certain elements. For example, various other input devices and/or output devices can be included in computer system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 500 are readily contemplated by one of ordinary skill in the art given the teachings of the present invention provided herein.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for implementing face recognition, comprising:
   receiving training data including a plurality of augmented images each corresponding to a respective one of a plurality of input images augmented by one of a plurality of variations;
   splitting a feature embedding generated from the training data into a plurality of sub-embeddings each associated with one of the plurality of variations;
   associating each of the plurality of sub-embeddings with respective ones of a plurality of confidence values; and
   applying a plurality of losses including a confidence-aware identification loss and a variation-decorrelation loss to the plurality of sub-embeddings and the plurality of confidence values to improve face recognition performance by learning the plurality of sub-embeddings.

2. The method as recited in claim 1, further comprising receiving the plurality of input images, and generating the plurality of augmented images by applying online variation data augmentation to introduce the plurality of variations into the plurality of input images.

3. The method as recited in claim 1, wherein the plurality of variations include blurriness, occlusion and pose.

4. The method as recited in claim 1, where the confidence-aware identification loss incorporates a confidence score associated with a loss margin to narrow a within-identity distribution and widen an inter-identity distribution.

5. The method as recited in claim 1, wherein the variation-decorrelation loss applies a classification loss on the plurality of variations and an adversarial loss on different partitions of the plurality of sub-embeddings.

6. The method as recited in claim 1, wherein the plurality of losses further includes an additional regularization to constrain confidence from growing arbitrary large.

7. The method as recited in claim 1, further comprising obtaining pairwise similarity scores according to respective image pairs, each of the pairwise similarity scores corresponding to learned sub-embedding importance.

8. A computer program product comprising a non-transitory computer readable storage medium having program instructions embodied therewith, the program instructions executable by a computer to cause the computer to perform a method for implementing face recognition, the method performed by the computer comprising:
   receiving training data including a plurality of augmented images each corresponding to a respective one of a plurality of input images augmented by one of a plurality of variations;
   splitting a feature embedding generated from the training data into a plurality of sub-embeddings each associated with one of the plurality of variations;
   associating each of the plurality of sub-embeddings with respective ones of a plurality of confidence values; and
   applying a plurality of losses including a confidence-aware identification loss and a variation-decorrelation loss to the plurality of sub-embeddings and the plurality of confidence values to improve face recognition performance by learning the plurality of sub-embeddings.

9. The computer program product as recited in claim 8, wherein the method further includes receiving the plurality of input images, and generating the plurality of augmented images by applying online variation data augmentation to introduce the plurality of variations into the plurality of input images.

10. The computer program product as recited in claim 8, wherein the plurality variations of include blurriness, occlusion and pose.

11. The computer program product as recited in claim 8, where the confidence-aware identification loss incorporates a confidence score associated with a loss margin to narrow a within-identity distribution and widen an inter-identity distribution.

12. The computer program product as recited in claim 8, wherein the variation-decorrelation loss applies a classification loss on the plurality of variations and an adversarial loss on different partitions of the plurality of sub-embeddings.

13. The computer program product as recited in claim 8, wherein the plurality of losses further includes an additional regularization to constrain confidence from growing arbitrary large.

14. The computer program product as recited in claim 8, wherein the method further includes obtaining pairwise similarity scores according to respective image pairs, each of the pairwise similarity scores corresponding to learned sub-embedding importance.

15. A system for implementing face recognition, comprising:
   a memory device storing program code; and
   at least one processor device operatively coupled to the memory device and configured to execute program code stored on the memory device to:
      receive training data including a plurality of augmented images each corresponding to a respective one of a plurality of input images augmented by one of a plurality of variations;
      split a feature embedding generated from the training data into a plurality of sub-embeddings each associated with one of the plurality of variations;
      associate each of the plurality of sub-embeddings with respective ones of a plurality of confidence values; and
      apply a plurality of losses including a confidence-aware identification loss and a variation-decorrelation loss to the plurality of sub-embeddings and the plurality of confidence values to improve face recognition performance by learning the plurality of sub-embeddings.

16. The system as recited in claim 15, wherein the system further includes receiving the plurality of input images, and generating the plurality of augmented images by applying online variation data augmentation to introduce the plurality of variations into the plurality of input images, and wherein the plurality variations of include blurriness, occlusion and pose.

17. The system as recited in claim 15, where the confidence-aware identification loss incorporates a confidence score associated with a loss margin to narrow a within-identity distribution and widen an inter-identity distribution.

18. The system as recited in claim 15, wherein the variation-decorrelation loss applies a classification loss on the plurality of variations and an adversarial loss on different partitions of the plurality of sub-embeddings.

19. The system as recited in claim 15, wherein the plurality of losses further includes an additional regularization to constrain confidence from growing arbitrary large.

20. The system as recited in claim 15, wherein the system further includes obtaining pairwise similarity scores according to respective image pairs, each of the pairwise similarity scores corresponding to learned sub-embedding importance.

* * * * *